Oct. 7, 1952    G. H. LISTER    2,613,253
ELECTRICAL CONTROL
Filed Dec. 7, 1946

INVENTOR
GEORGE H. LISTER
BY Hyde, Meyer, Baldwin & Doran
ATTORNEYS

Patented Oct. 7, 1952

2,613,253

UNITED STATES PATENT OFFICE 2,613,253

ELECTRICAL CONTROL

George H. Lister, Cleveland, Ohio, assignor to The Electronic Research and Manufacturing Corporation, Cleveland, Ohio, a corporation of Ohio Application December 7, 1946, Serial No. 714,821

5 Claims. (Cl. 175—320)

This invention relates to means for segregating a closely measured portion of an alternating current power cycle, substantially independent of line voltage variations, and the utilization of that measured portion, or a plurality of accumulated portions, for a control operation.

An object of the present invention is to segregate a portion of a power cycle as represented by the wave form of alternating current flow between two predetermined voltages whereby variations in the peak voltage have only a slight effect upon the portion of the power cycle segregated.

Another object of the present invention is to accumulate the effect of successive power cycle portions, as mentioned above, so as to perform a control operation.

A specific object of the present invention is to accumulate the effect of successive portions of alternating current power cycles, as mentioned above, in a thermal element which performs a control operation when it has been heated to a predetermined point.

Other objects and advantages of the present invention will be apparent from the accompanying drawings and description and the essential features thereof will be summarized in the appended claims.

In the drawings,

Fig. 3 is an electrical diagram showing another modification of a circuit for utilizing my invention; while

At the outset, I wish it understood that my invention may be applied to alternating electrical current having any wave form such as square, triangular, sine or otherwise. I have chosen to describe my invention by use of a sine wave diagram and have specifically referred to the sine wave throughout the description for simplicity of language. Those skilled in this art, however, will appreciate that the use of the invention is not confined to the sine wave form and, in fact, has even greater advantages when applied to some other wave forms.

Figure 4:
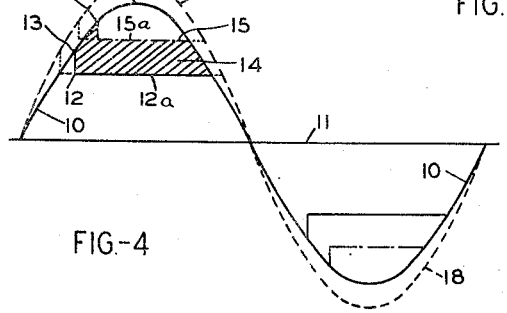
Fig. 4 is a diagram showing a wave form of alternating current flow marked to indicate the effect of my control apparatus in segregating a portion of the power cycle for a control use.

I will first explain the theory underlying the use of my invention and will then later describe one use of my invention together with modifications thereof. Referring first to Fig. 4, if an alternating current has the sine wave form indicated in full lines at 10, it will provide voltage patterns of similar shape alternately on opposite sides of the zero line 11. For the purpose of the present description, it is immaterial which side of the line 11 is regarded as positive or negative. My invention contemplates the use of a gas filled electronic tube having voltage regulator characteristics. I will later describe two types of tube which may be utilized in carrying out my invention, but without limiting myself to those two types alone. Assuming we have one such type of tube which regulates the voltage at 75 volts, such a tube will take a voltage as indicated by the full line 12 of Fig. 4 up to a peak 13 of perhaps 90 volts at which the gas in the tube ionizes after which the voltage will drop steeply to the 75 volt level, as indicated by the portion 12a of the line 12.

Now, if a second electronic tube similar to that described above is properly connected in an electrical circuit and having slightly higher voltage regulating characteristics, a portion 14 of the power cycle will be segregated between the conducting voltages of the two tubes, and this segregated portion of the power cycle may be utilized in a control operation. In Fig. 4 I have indicated by the dot-dash line 15 the control characteristic of such a second tube. The voltage curve of this second tube will rise to a peak 16, say at about 115 volts, at which point the gas of the tube will be ionized so that the voltage drops steeply to the portion 15a of the line and the tube will regulate at say 105 volts. The values of 75 and 105 volts are taken merely for example and not in a limiting sense.

In a 110 volt circuit the peak 17 of the sine wave will be approximately 155 volts plus. If, however, the line voltage should vary, as indicated by about ten percent increase in the dash line 18 of Fig. 4, the peak voltage at 19 would be of the order of 171 volts. Applying the characteristic curves 12 and 15 of the two voltage regulator tubes to the sine wave 18, as indicated in dotted lines in Fig. 4, it will be noted that the segregated portion of the power cycle has changed very slightly. The difference between sine waves 10 and 18 is somewhat exaggerated to show the effect rather than exact values. In other words, the second voltage regulator tube cuts off the peak of the power wave above the 105 volt level so that variations in peak voltage have little effect upon the segregated portion of the power cycle. Thus, the segregated portion 14 is quite constant under variations of line voltage and may be utilized in various ways to perform control functions, one of which will now be described. The line voltage may vary over quite a wide range as long as it is within the firing voltage of the control tubes used.

Figure 1:
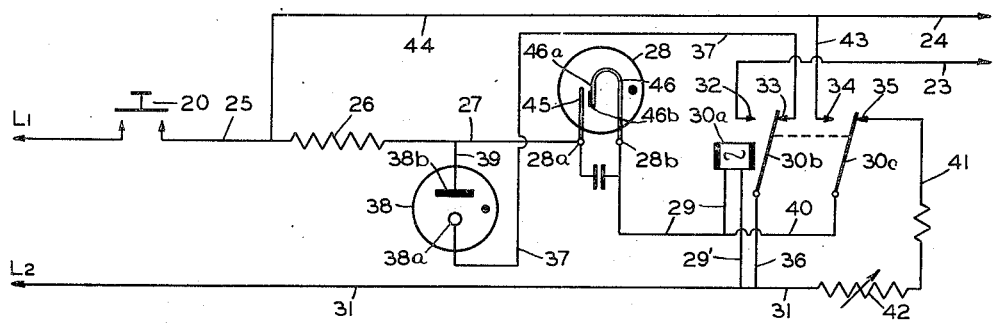
Fig. 1 is a diagrammatic view of an electrical circuit embodying my invention.

Referring now to Fig. 1, I have shown a source of line voltage L1, L2, the power from which is to be utilized upon the closing of switch 20 to complete a circuit. Thereafter, upon the termination of a predetermined time period it is desired to energize or deenergize a circuit connected between lines 23 and 24. My invention is utilized to determine this time period.

Line 25 is connected through resistance 26 and line 27 with one terminal 28a of tube 28, the other terminal of which 28b is connected through line 29, relay winding 30a and line 29' to line 31 leading back to L2. The relay armature 30b controls normally open contact 32 and normally closed contact 33. The relay armature 30c controls normally open contact 34 and normally closed contact 35. The armature 30b is connected by line 36 with line 31. Contact 32 is connected with line 23. Contact 33 is connected by line 37 with the cathode 38a of tube 38. The anode 38b of this tube is connected by line 39 with line 27.

The armature 30c of the relay is connected by line 40 with the terminal 28b of tube 28. The contact 35 is connected by line 41 through variable resistor 42 with line 31. The contact 34 is connected by line 43 with line 24 and by lines 43 and 44 with line 25.

Tube 28 is a gas filled tube of the FS type commonly used as a starter for fluorescent lights. Somewhat diagrammatically I have illustrated the vertical rod 45 connected with terminal 28a and the curved thermal element 46 connected with the terminal 28b. In this well known type of tube the thermal effect of the ionized gas on the end 46a of the thermal element causes this end to move in a clockwise direction as shown in Fig. 1, until the terminal bar 46b engages the post 45 whereupon the full current flows from line 27 to line 29. Tube 28 ionizes at 90 volts and regulates at 75 volts.

The tube 38 is a gas filled tube of the VR type which ionizes at 115 volts and which regulates at 105 volts.

The operation of the device of Fig. 1 should now be readily understood. When switch 20 is closed, current flows through line 25, resistance 26 and line 27 through tube 28, insofar as the ionized gas of tube 28 is conducting. In other words, the flow of current through tube 28 is represented by that portion of the sine wave 10 in the first half cycle and above line 12. This represents the flow of current from rod 45 to the thermal element 46 during one half cycle because it is well known that the flow in the opposite direction during the other half cycle has but a small percentage of the total heating effect upon the thermal element. The tube 28 should be properly polarized to provide whatever heating time is required. If the two control tubes are operated in opposite directions, a smaller heating effect per cycle will result than if the two tubes are operated in the same direction.

All of the current flowing through line 25 and resistance 26 does not pass through tube 28 because tube 38 is also connected at this time between line 27 and line 31 through contact 33. Therefore, tube 38 at this time is conducting that portion of the wave 10 in the first half cycle and above the line 15. In other words, this portion of the power wave above line 15 is shunted off through tube 38 and is not available to pass through tube 28. Therefore, the actual flow through tube 28 is represented by the portion 14 of the diagram of Fig. 4. The relay 30a is so chosen that the current segregated in the portion 14 (being only a fraction of a half cycle) is not enough to operate the relay. The above described half cycle is repeated at every succeeding half cycle above the line 11 of Fig. 4 so that successive increments as represented by the portion 14 are utilized to heat the thermal element 46. When a sufficient heating effect has accumulated in the thermal element 46 due to these repeated half cycles, the tube 28 short-circuits through contact of the elements 46b and 45. Thereupon, the line current flows through lines 27 and 29 to the relay coil 30a so as to operate the relay.

Upon energization of the relay the armature 30b opens contact 33 and closes contact 32. Opening contact 33 disconnects tube 38. Closing of contact 32 connects line 23 with the power line 31. Energization of the relay causes armature 30c to open contact 35 and to close contact 34. This by-passes tube 28 so that thereafter the line current flows through lines 25, 44 and 43 through contact 34, armature 30c and lines 40 and 29 to relay 30a to maintain the relay energized. Thereafter, no further current flows through tube 28 and the thermal element 46 quickly cools off. The tube 28 cools off quickly, partly because it is a gas filled tube and partly because the thermal element 46 quickly conducts heat along the normally unheated portion thereof. It will be noted that line 24 is always connected by line 44 with the source L1 and therefore, upon operation of the relay to energize line 23, the controlled circuit connected between lines 23 and 24 will be energized. This will take place a predetermined time after the closing of switch 20 because the heating of the thermal element 46 depends upon a plurality of measured segregated power cycle portions as illustrated at 14 in Fig. 4. Upon the opening of switch 20, the relay winding 30a is deenergized and means not shown re-establishes contact at 33 and 35, while breaking contact at 32 and 34. The device is then ready for another similar operation.

The purpose of the variable resistor 42 is to provide variations in the time necessary to energize the relay winding 30a.

Figure 2:
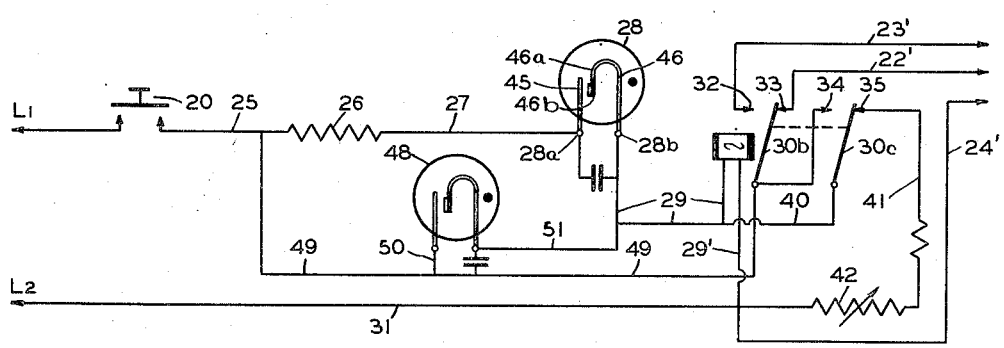
Fig. 2 is a diagrammatic view of a modified circuit for utilizing my invention.

In Fig. 2, I have shown a modification utilizing tube 28 in the same position and performing the same function as formerly and using a second tube 48 of the FS type but having very similar conducting characteristics as tube 38 previously described. For instance, if tube 28 is an FS2 which regulates at 75 volts, the tube 48 may be an FS4 which regulates at 105 volts. The characteristic conduction and regulation curve of tube 48 is almost exactly like the dot-dash line 15 shown in Fig. 4. The device of Fig. 2 operates exactly like the device of Fig. 1 except that tube 48 is connected between line 25 and line 29 to by-pass some of the current which otherwise would pass through tube 28 and all current passing through tube 48, prior to the operation of relay 30a, will flow through the relay winding 30a, whereas in Fig. 1, the current by-passed through tube 38 flowed directly from L1 to L2 without going through the relay winding. However, the relay winding 30a of Fig. 2 is of the order of one thousand to two thousand ohms resistance and the relay is not operated by the current passing through tubes 28 and 48 until the element 46 makes contact with the element 45.

It is believed the operation of Fig. 2 will be readily understood after the description given of Fig. 1 and further comment is unnecessary except to state that when switch 20 is closed, current flows through the tubes 28 and 48 according to their characteristic curves. The upper portion of the power wave above the line 15 of Fig. 4 is by-passed through lines 49 and 50, tube 48 and line 51, and passes through the relay winding 30a without causing operation thereof. The portion of the power wave above the line 12, as shown diagrammatically in Fig. 4 and up to the line 15 is a segregated portion of the power cycle which flows through tube 28, line 29 and relay winding 30a, without causing operation of the same until the thermal element 46 has been heated by a plurality of these accumulated segregated power portions 14 (see Fig. 4). Here, as in the case of Fig. 1, when the thermal element 46 causes the rod 46b to touch the rod 45, the line current flows through the relay winding 30a which causes operation of the relay. This closes contact 34 and opens contact 35 so as to connect the relay winding directly between L1 and L2 by-passing both tubes 28 and 48 so that their thermal elements cool quickly ready for another cycle. At the same time, the relay closes contact 32 and opens contact 33 so as to energize the control circuit which is connected between lines 23' and 24', or to deenergize a circuit connected between 22' and 24', a predetermined time after closing switch 20.

Figure 3:
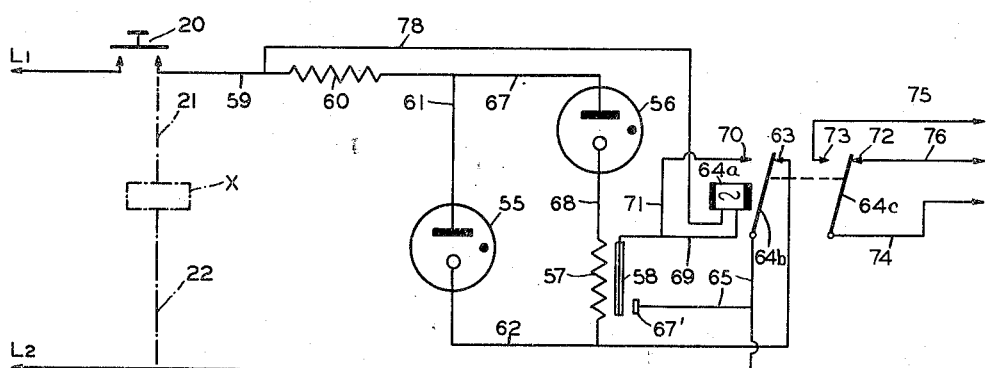

The modification of Fig. 3 utilizes two tubes of the VR type operating on the same principle as previously described, whereby the tube 55 by-passes the upper portion of the power wave lying above line 15 of Fig. 4, and the tube 56 passes that portion of the power wave lying between lines 12 and 15 of Fig. 4. Here, the segregated portions 14 of the power cycle are not utilized to heat a thermal element in the tube itself like the element 46 of Figs. 1 and 2, but instead, these successive segregated portions of power cycles are passed through a heater resistance 57 which heats the bimetallic thermal element 58 so that the effect of the successive segregated portions is accumulated in the thermal element 58. The tube 56 is of the VR75 type which ionizes at 90 volts and regulates at 75 volts and has a characteristic curve like that shown at 12 in Fig. 4. The tube 55 is a VR105 type which ionizes at 115 volts and regulates at 105 volts having the characteristic curve shown at 15 of Fig. 4. Both of these are gas filled tubes. Obviously the voltages 75 and 105 are illustrative only.

When the switch 20 is closed, current flows through line 59, resistance 60, line 61, tube 55, line 62, normally closed contact 63, relay armature 64b, line 65 and line 66, back to L2. This circuit conducts the portion of the power wave lying above the line 15 of Fig. 4. At the same time, part of the power from L1 flows through line 67, tube 56, line 68 and resistance 57 to line 62 and then through contact 63 and lines 65 and 66 back to L2. The current flowing in this latter circuit is represented by the segregated portion 14 of Fig. 4. When sufficient of these segregated portions have flowed through resistance 57 to heat the thermal element 58, the latter closes contact 67' so that power then flows from line L1 through lines 59 and 78 through the relay winding 64a and through line 69, thermal element 58, contact 67' and lines 65 and 66, back to L2. This operates the relay opening contact 63 and closing contact 70 so that the relay winding 64a is now directly connected between lines 78, 69 and 71 back through lines 65 and 66 to L2. This maintains the relay energized and by-passes the thermal element 58, the resistance 57 and the tubes 55 and 56, so that the thermal element cools off ready for another cycle. When the relay is energized, the armature 64c opens contact 72 and closes contact 73 so as to connect a control circuit through lines 74 and 75, or to disconnect a circuit depending upon 74, 64c and 76. Thus, this control circuit is energized (or deenergized) a predetermined time after the closing of switch 20, and this time is accurately controlled because of the accumulation of a number of carefully measured power portions 14 accumulated on the thermal element 58 to give a cumulative timing effect.

It will thus be seen that I may utilize a plurality of segregated power portions out of successive power cycles to provide a control effect. The power portions may be segregated by utilizing any combination of tubes having appropriate control characteristics such as the two FS type tubes of Fig. 2, the two VR type tubes of Fig. 3 or one of each type, as illustrated in Fig. 1. The cumulative effect of a plurality of segregated power portions is made effective by heating a thermal element 46 as in Figs. 1 and 2 which is an element within a tube, or they may be accumulated on a thermal element 58 in Fig. 3 outside of a tube.

Other ways of accumulating successive segregated power portions according to my invention for other control purposes will readily occur to those skilled in this art.

It should be understood that my invention is not limited to the specific tubes shown for illustration. Many types of tubes may be used regulating at various voltages so as to utilize the principles disclosed above.

It should also be understood that the control circuit, to be energized a predetermined time after closing switch 20, need not be controlled by external contacts but it might be connected between lines 69 and 78 (Fig. 3) in parallel with relay coil 64a, which is only energized a predetermined time after switch 20 closes.

Referring to Fig. 3, I have shown in dot-dash lines how a load X may be connected between lines 59 and 66 by lines 21 and 22. In this case load X is energized as soon as button 20 is depressed, and the controlled circuit at 74, 75, 76 will be affected a predetermined time thereafter.

What I claim is:

1. In combination, a source of alternating current, a space discharge device and an associated current limiting resistor in circuit therewith, said device and resistor connected with said source, said device being adapted to pass current only above a predetermined lower voltage level, a second space discharge device connected in circuit with said source and in shunt circuit around said first device and said current limiting resistor, said second device being adapted to pass current only above a predetermined higher voltage level, whereby said first device passes current at each alternating current cycle only between said two voltage levels, means heated by the current passing said first device, a pair of contacts, and said last named means positioned to close said contacts upon receiving a predetermined amount of heat.

2. In combination, a source of alternating current, a space charge device and an associated current limiting resistor in circuit therewith, said device and resistor connected with said source, said device comprising a tube filled with gas adapted to be ionized by voltage applied to said tube after which current flows in said tube, said tube having two electrodes one of which is heated by ionizing current in said tube to a predetermined degree to cause said electrodes to engage and to conduct the line current from said source, said device being adapted to regulate the current flowing at a predetermined lower voltage level when said gas is ionized, a second space charge device connected in circuit with said source and in shunt circuit around said first device and said current limiting resistor, said second device being adapted to pass current only above a predetermined higher voltage level, whereby said first device passes current only between said two voltage levels, and a controlled device connected in circuit with said first device and energized by current flowing through said first device, said controlled device being inoperative when energized by said ionizing current flowing between said electrodes disengaged and being actuated by said line current flowing between said electrodes engaged.

3. The combination of claim 2 including an electrical circuit closer, and means for energizing said first named space charge device simultaneously with operation of said circuit closer, whereby said controlled device is operatively energized a predetermined time after said circuit closer is operated.

4. In combination, a source of alternating current, a space charge device and an associated current limiting resistor in circuit therewith, said device and resistor connected with said source, said device comprising a tube filled with gas adapted to be ionized by voltage applied to said tube after which current flows in said tube, said device being adapted to regulate the current flowing at a predetermined lower voltage level when said gas is ionized, a second space charge device connected in circuit with said source and in shunt circuit around said first device and said current limiting resistor, said second device being adapted to pass current only above a predetermined higher voltage level, whereby said first device passes current only between said two voltage levels, a bimetallic thermal element connected in circuit with said first device to be heated by current passing said first device, a contact adapted to be closed by said bimetallic element only after a plurality of alternations of said current source has heated said bimetallic element a predetermined amount, and controlled means connected to be energized through said closed contact.

5. In combination, a source of alternating current, a space charge device and an associated current limiting resistor in circuit therewith, said device and resistor connected with said source, said device comprising a tube filled with gas adapted to be ionized by voltage applied to said tube after which current flows in said tube, said device being adapted to regulate the current flowing at a predetermined lower voltage level when said gas is ionized, a second space charge device connected in circuit with said source and in shunt circuit around said first device and said current limiting resistor, said second device being adapted to pass current only above a predetermined higher voltage level, whereby said first device passes current only between said two voltage levels, a resistor connected in circuit with said first device to be heated by current passing said first device, a bimetallic thermal element positioned adjacent said resistor to be heated thereby, a contact adapted to be closed by said bimetallic element only after a plurality of alternations of said current source has heated said bimetallic element a predetermined amount, and controlled means connected to be energized through said closed contact.

GEORGE H. LISTER.

REFERENCES CITED

The following references are of record in the file of this patent:

UNITED STATES PATENTS

| Number | Name | Date |
|---|---|---|
| 1,960,068 | Ruppel | May 22, 1934 |
| 2,009,601 | Anderson | July 30, 1935 |
| 2,071,984 | Minneci | Feb. 23, 1937 |
| 2,141,654 | Kott | Dec. 27, 1938 |
| 2,146,862 | Shumard | Feb. 14, 1939 |
| 2,246,046 | Holden | June 17, 1941 |
| 2,267,098 | Hays | Dec. 23, 1941 |
| 2,277,000 | Bingley | Mar. 17, 1942 |
| 2,379,262 | Terry | June 26, 1945 |
| 2,414,443 | Busch et al. | Jan. 21, 1947 |
| 2,419,546 | Grieg | Apr. 29, 1947 |
| 2,524,325 | Mentzer | Oct. 3, 1950 |